US011740798B2

(12) United States Patent
Nossenson et al.

(10) Patent No.: US 11,740,798 B2
(45) Date of Patent: Aug. 29, 2023

(54) MANAGING SHARED RESOURCE USAGE IN NETWORKED STORAGE SYSTEMS

(71) Applicant: NETAPP, INC., San Jose, CA (US)

(72) Inventors: Nir Nossenson, Waltham, MA (US); Kai Niebergall, Ditzingen (DE); Francisco Jose Assis Rosa, Sudbury, MA (US); John Jason Sprague, Westford, MA (US); Omri Kessel, Newton, MA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/650,917

(22) Filed: Feb. 14, 2022

(65) Prior Publication Data

US 2023/0106208 A1 Apr. 6, 2023

Related U.S. Application Data

(60) Provisional application No. 63/251,871, filed on Oct. 4, 2021.

(51) Int. Cl.
*G06F 3/06* (2006.01)

(52) U.S. Cl.
CPC .......... *G06F 3/0613* (2013.01); *G06F 3/0604* (2013.01); *G06F 3/067* (2013.01); *G06F 3/0635* (2013.01); *G06F 3/0644* (2013.01); *G06F 3/0659* (2013.01)

(58) Field of Classification Search
CPC .... G06F 3/0613; G06F 3/0604; G06F 3/0635; G06F 3/0644; G06F 3/0659; G06F 3/067
See application file for complete search history.

(56) References Cited

U.S. PATENT DOCUMENTS

| | | | |
|---|---|---|---|
| 8,688,878 B1 * | 4/2014 | Dolan | G06F 3/0653 710/33 |
| 9,411,834 B2 | 8/2016 | Hrischuk et al. | |
| 9,547,445 B2 | 1/2017 | Faulkner et al. | |
| 10,250,684 B2 | 4/2019 | Dimnaku et al. | |
| 10,389,809 B2 | 8/2019 | Kessel et al. | |
| 2015/0199136 A1 * | 7/2015 | Faulkner | G06F 3/0689 711/114 |
| 2015/0199388 A1 | 7/2015 | Hrischuk et al. | |
| 2017/0201580 A1 * | 7/2017 | Dimnaku | H04L 43/0852 |

* cited by examiner

*Primary Examiner* — Michelle T Bechtold
(74) *Attorney, Agent, or Firm* — Loza & Loza, LLP; Tejinder Singh

(57) ABSTRACT

Methods and systems for a networked storage system are provided. One method includes predicting an IOPS limit for a plurality of storage pools based on a maximum allowed latency of each storage pool, the maximum allowed latency determined from a relationship between the retrieved latency and a total number of IOPS from a resource data structure; identifying a storage pool whose utilization has reached a threshold value, the utilization based on a total number of IOPS directed towards the storage pool and a predicted IOPS limit; detecting a bully workload based on a numerical value determined from a total number of IOPS issued by the bully workload for the storage pool and a rising step function; and implementing a corrective action to reduce an impact of the bully workload on a victim workload.

20 Claims, 14 Drawing Sheets

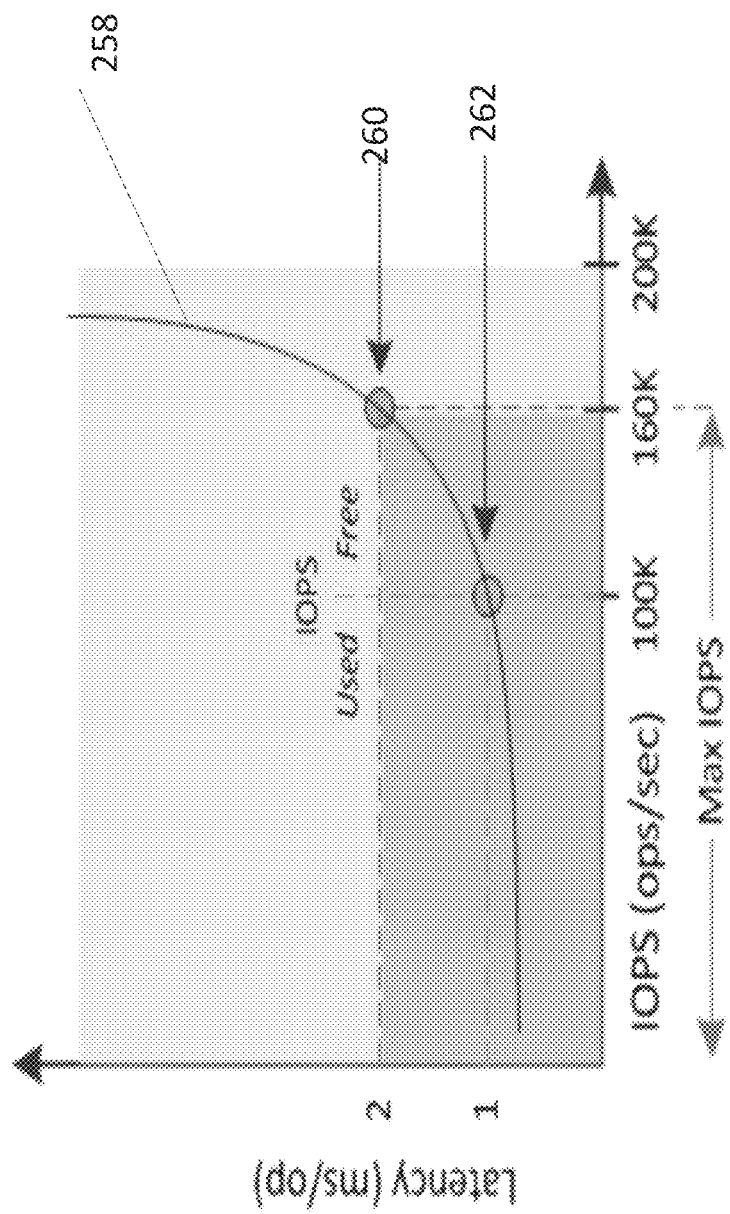

US 11,740,798 B2

MANAGING SHARED RESOURCE USAGE IN NETWORKED STORAGE SYSTEMS

CROSS-REFERENCE TO RELATED APPLICATION

This patent application claims priority under 35 USC § 119 (e) to U.S. Provisional Patent Application, Ser. No. 63/251,871 filed on Oct. 4, 2021, entitled, "MANAGING SHARED RESOURCE USAGE IN NETWORKED STORAGE SYSTEMS", the disclosure of which is incorporated herein in its entirety.

TECHNICAL FIELD

The present disclosure relates to storage systems, and more particularly, to improving resource usage in networked and cloud-based storage systems.

BACKGROUND

Various forms of storage systems are used today. These forms include direct attached storage (DAS) systems, network attached storage (NAS) systems, storage area networks (SANs), and others. Network storage systems are commonly used for a variety of purposes, such as providing multiple users with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices. Storage systems are used by different applications, for example, database systems, electronic mail (email) servers, virtual machines executed within virtual machine environments (for example, a hypervisor operating environment) and others to store and protect data.

Storage today is also available in a cloud computing environment where storage space is presented and shared across different cloud computing platforms. Cloud computing means computing capability that provides an abstraction between a computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" herein is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer is a cloud platform and cloud infrastructure, followed by a "server" layer that includes hardware and computer software designed for cloud specific services.

Managing different resources, e.g., compute, storage and/or network resources in the cloud environment can be challenging. Most conventional systems monitor and analyze individual resources without understanding the correlation between resources and workloads that use the resources. Continuous efforts are being made to develop technology to efficiently use resources in a networked environment including cloud-based storage systems.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures:

FIG. 2F shows an example of a relationship between latency and a sum of IOPS to determine headroom (or available capacity), according to various aspects of the present disclosure;

DETAILED DESCRIPTION

Figure 1A:
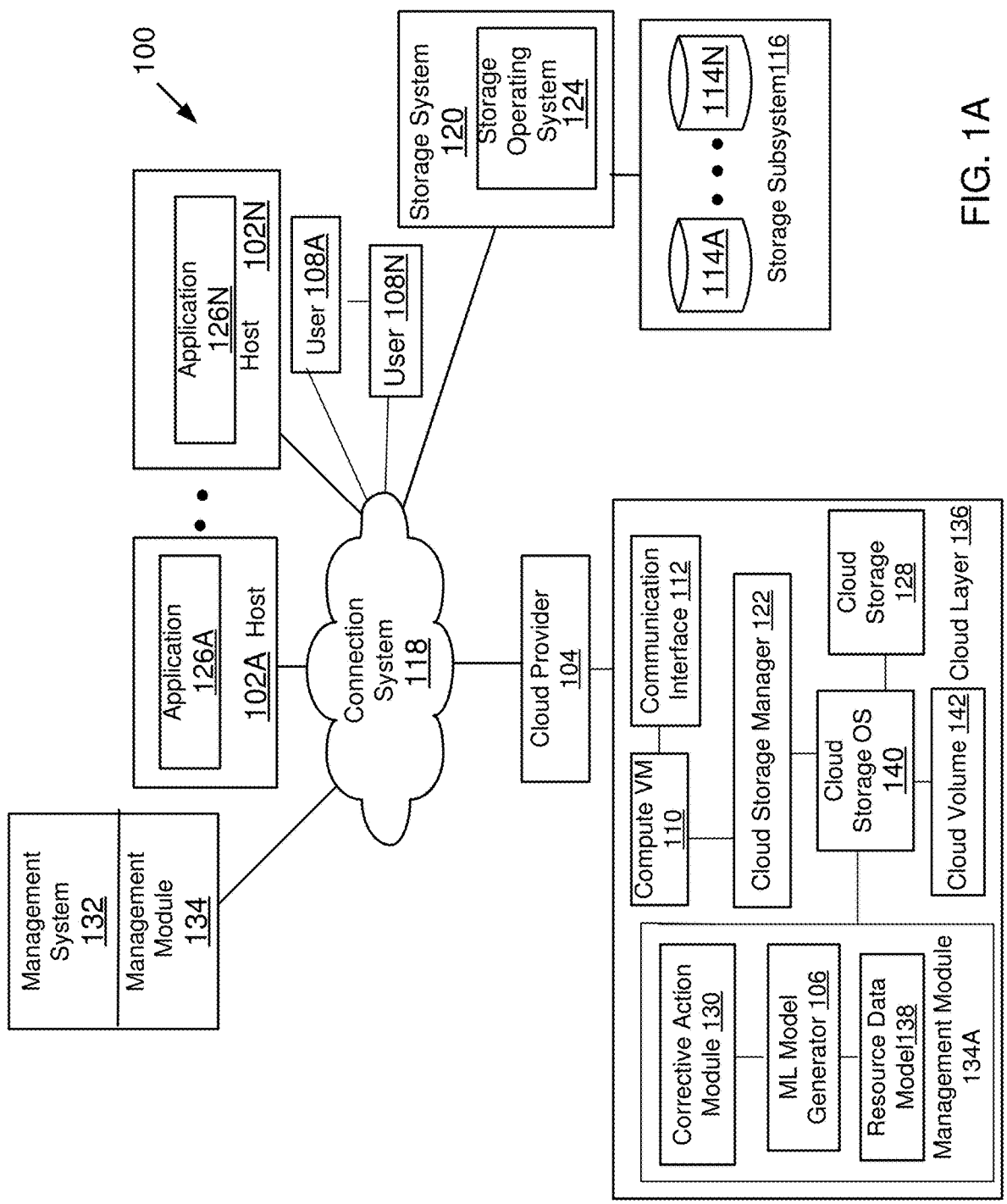
FIG. 1A shows an example of an operating environment, according to various aspects of the present disclosure.

In one aspect, innovative technology is disclosed that evaluates relationships and correlation between different resources of a networked environment. For example, a compute resource including a virtual machine or a POD (a deployable computing unit) in a container-based environment (e.g., Kubernetes) may issue input/output ("I/O") requests to read and write data from and to a shared storage resource, e.g., a storage pool, an aggregate, volume and others, as described below. This may negatively impact the shared resource and other workloads. The term workload as used herein means an entity (e.g., a processor executable application, a virtual machine, or a micro-service executed in a cloud layer) that generates I/O requests.

The innovative technology disclosed herein uses queuing theory and machine learning to build a model for each resource of a networked storage system, including storage resources. The model is built overtime and defines optimum use limit of each resource, as described below. The model evaluates in real-time each resource and the workloads using each resource. The model also tracks the available headroom (i.e., available performance capacity of each resource). The machine learned model then predicts and/or determines if the resource is in contention or is likely to be in contention. Resource contention is defined for resource type e.g., for a storage resource, contention is defined by a limit on the number IOPS that can be processed by the storage resource. Once resource contention is defined, the model identifies bully and victim workloads. A bully workload is a workload that is considered "greedy" or "impactful" i.e., the workload use of the resource is more than optimum and may negatively impact other workloads. The victim workloads are the "degraded" or "impacted" workloads that are negatively impacted by the bully workload usage.

In one aspect, upon identifying the bully and victim workload, automated corrective action is taken, which may involve migrating certain workloads from one resource to another, implementing quality of service ("QOS") polices with fine-tuned limits to ensure better performance, and implementing additional capacity (e.g. storage, CPU/memory) that a shared resource can use based on historical demand tracked by the machine learned model and recent changes.

In summary, the innovative technology disclosed herein identifies an anomaly (or cause of stress/negative impact on resource usage) in real-time; deploys a machine learned model that uses queuing theory to determine if one or more resources are under stress and then automatically provides a solution for correcting the anomaly.

Before providing details of the innovative technology, the following brief overview of some of the terms used in this disclosure maybe helpful:

QoS is used in a network storage environment to provide certain throughput in processing I/O requests, a response time goal within, which I/O requests are processed and a number of I/O requests that can be processed within a given time (for example, in a second (IOPS). QoS limit can be set for storage volumes to limit the number of IOPS for one or more workloads.

Throughput means an amount of data transferred within a given time in response to I/O requests, for example, in megabytes per second (Mb/s).

Latency as used herein means a delay in processing an I/O request and may be measured using different metrics for example, a response time.

Headroom, as used herein means available performance capacity of a resource at any given time. Headroom can be based on a relationship between latency and a maximum number of IOPS that can be processed by the resource. Peak performance capacity of a resource may be determined according to performance limits that may be based on the machine learned model of the present disclosure and/or set policies (for example, QOS or service level objectives (SLOs)). An example of latency v. IOPS curve is shown in FIG. 2F, where latency is plotted on the Y-axis and maximum IOPS is plotted on the X-axis. An optimal point 260, after which latency shows a rapid increase represents maximum (or optimum) utilization of a resource beyond which an increase in workload is associated with higher throughput gains than latency increase. Beyond the optimal point, if the workload increases at a resource, the throughput gains or utilization increase is smaller than the increase in latency. An operational point 262 shows a current throughput of the resource. At a high level, the available headroom at any given time can be defined by the following relationship:

$$\text{Headroom} = \frac{\text{Optimal Point} - \text{Operational Point}}{\text{Optimal Point}}$$

Specifically, as used in this specification, Headroom=1−IOPS Utilization
Where, IOPS Utilization=(CurrentIOPS)/MaxAllowed IOPS
Where MaxAllowed IOPS=$q_{max}$*Baseline IOPS
where $q_{max}$ is a maximum queue depth and the term "queue" in this context means an average wait time for processing an I/O request.
Baseline IOPS=A threshold IOPS level for a client system/workload.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components may be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

FIG. 1A shows an example of a system 100 to implement the various adaptive aspects of the present disclosure. In one aspect, system 100 includes a cloud layer 136 having a cloud storage manager (may also be referred to as "cloud manager") 122, and a cloud storage operating system (may also be referred to as "Cloud Storage OS") 140 having access to cloud storage 128. The cloud storage manager 122 enables configuration and management of storage resources.

In one aspect, a management module 134A (or management module 134 for an on-premise storage systems) is provided to generate a machine learned ("ML") resource data model 138 for tracking resources, identifying bully and victim workloads, as described below in detail. In one aspect, the management module 134A includes a ML model generator 106 that has access to the resource data model 138 (may also be referred to as resource data structure 138 or resource data 138), described below in detail with respect to FIG. 1C. At a high level, the resource data model 138 identifies workloads that are issued by different entities to store and/or retrieve information stored within system 100. The term entity as used herein includes applications, virtual machines, client computing devices or any other processor executable requests. The resource data model 138 includes information regarding storage utilization, IOPS, latency and other information, as described below in detail. The ML model generator 106 identifies bullies and victim workloads, also described below in detail. Based on the identified bullies and victims, a corrective action module 130 initiates a corrective action to resolve resource contention. The type of corrective action depends on the type of resource contention. For example, if a bully workload is using too much storage space, then the bully workload may be assigned more storage space. If a bully workload is generating too many I/O requests to a particular storage volume, then other storage volumes may be assigned to the bully workload.

As an example, a cloud provider 104, provides access to the cloud layer 136 and its components via a communication interface 112. A non-limiting example of the cloud layer 136 is a cloud platform, e.g., Amazon Web Services ("AWS") provided by Amazon Inc., Azure provided by Microsoft Corporation, Google Cloud Platform provided by Alphabet Inc. (without derogation of any trademark rights of Amazon Inc., Microsoft Corporation or Alphabet Inc.), or any other cloud platform. In one aspect, communication interface 112 includes hardware, circuitry, logic and firmware to receive and transmit information using one or more protocols. As an example, the cloud layer 136 can be configured as a virtual private cloud (VPC), a logically isolated section of a cloud infrastructure that simulates an on-premises data center with an on-premise, storage system 120.

In one aspect, the cloud manager 122 is provided as a software application running on a computing device or within a VM for configuring, protecting and managing storage objects. In one aspect, the cloud manager 122 enables access to a storage service (e.g., backup, restore, cloning or any other storage related service) from a "micro-service" made available from the cloud layer 136. In one aspect, the cloud manager 122 stores user information including a user identifier, a network domain for a user device, a user account identifier, or any other information to enable access to storage from the cloud layer 136.

Software applications for cloud-based systems are typically built using "containers," which may also be referred to as micro-services. Kubernetes is an open-source software platform for deploying, managing and scaling containers including the cloud storage OS 140, the cloud manager 122 and the management module 134A. It is noteworthy that the management module 134A may run within the cloud manager 122. Azure is a cloud computing platform provided by Microsoft Corporation (without derogation of any third-party trademark rights) for building, testing, deploying. and managing applications and services including the cloud storage OS 140, the cloud manager 122 and the management module 134A. Azure Kubernetes Service enables deployment of a production ready Kubernetes cluster in the Azure cloud for executing the cloud storage OS 140, the cloud manager 122 and the management module 134A. It is noteworthy that the adaptive aspects of the present disclosure are not limited to any specific cloud platform.

The term micro-service as used herein denotes computing technology for providing a specific functionality in system 100 including QoS and access to storage via the cloud layer 136. As an example, the cloud storage OS 140, the cloud manager 122 and the management module 134A are micro-services, deployed as containers (e.g., "Docker" containers), stateless in nature, may be exposed as a REST (representational state transfer) application programming interface (API) and are discoverable by other services. Docker is a software framework for building and running micro-services using the Linux operating system kernel (without derogation of any third-party trademark rights). As an example, when implemented as docker containers, docker micro-service code for the cloud storage OS 140, the cloud manager 122 and the management module 134A is packaged as a "Docker image file". A Docker container for the cloud storage OS 140, the cloud manager 122 and the management module 134A is initialized using an associated image file. A Docker container is an active or running instantiation of a Docker image. Each Docker container provides isolation and resembles a lightweight virtual machine. It is noteworthy that many Docker containers can run simultaneously in a same Linux based computing system. It is noteworthy that although a single block is shown for the management module 134A, the cloud manager 122 and the cloud storage OS 140, multiple instances of each micro-service (i.e., the management module 134A, the cloud manager 122 and the cloud storage OS 140) can be executed at any given time to accommodate multiple user systems 108.

In one aspect, the management module 134A, the cloud manager 122 and the cloud storage OS 140 can be deployed from an elastic container registry (ECR). As an example, ECR is provided by AWS (without derogation of any third-party trademark rights) and is a managed container registry that stores, manages, and deploys container images. The various aspects described herein are not limited to the Linux kernel or using the Docker container framework.

An example of the cloud storage OS 140 includes the "CLOUD VOLUMES ONTAP" software provided by NetApp Inc., the assignee of this application. (without derogation of any trademark rights) The cloud storage OS 140 is a software defined version of a storage operating system 124 executed within the cloud layer 136 or accessible to the cloud layer 136 to provide storage and storage management options that are available via the storage system 120, also referred to as an "on-premises" storage system. The cloud storage OS 140 has access to cloud storage 128, which may include block-based, persistent storage that is local to the cloud storage OS 140 and object-based storage that may be remote to the cloud storage OS 140.

In another aspect, in addition to cloud storage OS 140, a cloud-based storage service is made available from the cloud layer 136 to present storage volumes (shown as cloud volume 142). An example of the cloud-based storage service is the "Cloud Volume Service," provided by NetApp Inc. (without derogation of any trademark rights). The term volume or cloud volume (used interchangeably throughout this specification) means a logical object, also referred to as a storage object, configured to store data files (or data containers or data objects), scripts, word processing documents, executable programs, and any other type of structured or unstructured data. From the perspective of a user system 108, each cloud volume can appear to be a single storage drive. However, each cloud volume can represent the storage space in one storage device, an aggregate of some or all the storage space in multiple storage devices, a RAID group, or any other suitable set of storage space. The various aspects of the present disclosure may include both the Cloud storage OS 140 and the cloud volume service or either one of them.

For a traditional on-premises, storage system 120, QoS is provided by monitoring and controlling processing of I/O requests for writing and reading stored data. This is typically implemented by the management module 134 of a management system 132 and the storage operating system 124. In one aspect, management module 134A is an instance of the management module 134 in the cloud layer 136.

System 100 may also include one or more computing systems 102A-102N (shown as host 102, 102A-102N and may also be referred to as a "host system 102", "host systems 102", "server 102" or "servers 102") communicably coupled to a storage system 120 (may also be referred to as an "on-premise" storage system) executing a storage operating system 124 via the connection system 118 such as a local area network (LAN), wide area network (WAN), the Internet and others. As described herein, the term "communicably coupled" may refer to a direct connection, a network connection, or other connections to provide data-access service to user consoles (or computing devices) 108A-108N (may also be referred to as "user 108," "users 108," "client system 108" or "client systems 108").

Client systems 108 are computing devices that can access storage space at the storage system 120 via the connection system 118 or from the cloud layer 136 presented by the cloud provider 104 or any other entity. The client systems 108 can also access computing resources, as a virtual machine ("VM") (e.g., compute VM 110) via the cloud layer 136. A client may be the entire system of a company, a department, a project unit or any other entity. Each client system is uniquely identified and optionally, may be a part of a logical structure called a storage tenant (not shown). The storage tenant represents a set of users (may also be referred to as storage consumers) for the cloud provider 104 that provides access to cloud-based storage and/or compute resources (e.g., 110) via the cloud layer 136 and/or storage managed by the storage system 120.

In one aspect, host systems 102A-102N of system 100 are configured to execute a plurality of processor-executable applications 126A-126N (may also be referred to as "application 126" or "applications 126"), for example, a database application, an email server, and others. These applications may be executed in different operating environments, for example, a virtual machine environment, Windows, Solaris, Unix (without derogation of any third-party rights) and others. The applications 126 use storage system 120 to store information at storage devices, as described below. Although hosts 102 are shown as stand-alone computing devices, they may be made available from the cloud layer 136 as compute nodes executing applications 126 within VMs (shown as compute VM 110).

Each host system 102 interfaces with the management module 134 of the management system 132 for managing backups, restore, cloning and other operations for a non-cloud-based storage system, e.g., storage system 120. In this context the management system 132 is referred to as an "on-premises" management system. Although the management system 132 with the management module 134 is shown as a stand-alone module, it may be implemented with other applications, for example, within a virtual machine environment. Furthermore, the management system 132 and the management module 134 may also be referred to interchangeably throughout this specification.

In one aspect, the on-premises, storage system 120 has access to a set of mass storage devices 114A-114N (may also be referred to as "storage devices 114" or "storage device 114") within at least one storage subsystem 116. The storage devices 114 may include writable storage device media such as solid-state drives, storage class memory, magnetic disks, video tape, optical, DVD, magnetic tape, non-volatile memory devices, for example, self-encrypting drives, or any other storage media adapted to store structured or non-structured data. The storage devices 114 maybe organized as one or more groups of Redundant Array of Independent (or Inexpensive) Disks (RAID). The various aspects disclosed are not limited to any specific storage device or storage device configuration.

The storage system 120 provides a set of storage volumes (may also be referred to as "volumes") directly to host systems 102 via the connection system 118. In another aspect, the storage volumes are presented by the cloud storage OS 140, and in that context a storage volume is referred to as a cloud volume (e.g., 142). The storage operating system 124/cloud storage OS 140 present or export data stored at storage devices 114/cloud storage 128 as a volume (or a logical unit number (LUN) for storage area network ("SAN") based storage).

The storage operating system 124/cloud storage OS 140 are used to store and manage information at storage devices 114/cloud storage 128 based on a request generated by application 126, user 108 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120 or the cloud storage OS 140, based on the request. Storage system 120/cloud storage OS 140 receives the I/O requests, issues one or more I/O commands to storage devices 114/cloud storage 128 to read or write data on behalf of the host system 102 and issues a response containing the requested data over the network 118 to the respective host system 102.

Although storage system 120 is shown as a stand-alone system, i.e., a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage system 120 (or the cloud storage OS 140) can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer can span one or more physical nodes, each of which can hold storage associated with one or more VServers. User systems 108/host 102 can access the data on a VServer from any node of the clustered system, through the virtual interface associated with that VServer. It is noteworthy that the aspects described herein are not limited to the use of VServers.

As an example, one or more of the host systems (for example, 102A-102N) or a compute resource (not shown) of the cloud layer 136 may execute a VM environment where a physical resource is time-shared among a plurality of independently operating processor executable VMs (including compute VM 110). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resource may include one or more processors, resources resident on the processors (e.g., control registers, caches, and others), memory (instructions residing in memory, e.g., descriptor tables), and other resources (e.g., input/output devices, host attached storage, network attached storage or other like storage) that reside in a physical machine or are coupled to the host system.

Figure 1B:
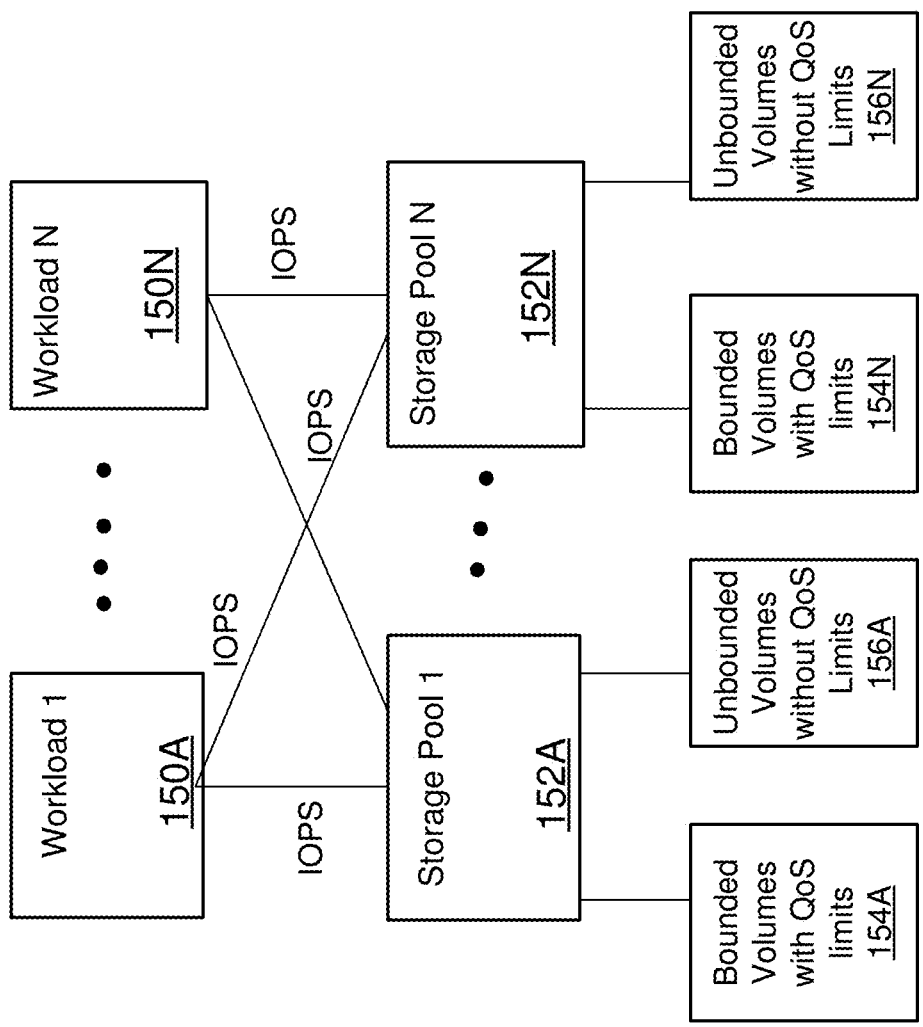
FIG. 1B shows an example of workloads using storage resources in a networked environment, according to various aspects of the present disclosure.

FIG. 1B shows a relationship between different workloads 150A-150N (may also be referred to as workload 150 or workloads 150) and storage pools 152A-152N (may also be referred to as storage pool 152 or storage pools 152), according to one aspect of the present disclosure. Workloads 150 include application 126, compute VM 110, any microservice or processor executable software that generates IOPS for one or more storage volumes associated with the storage pools 152. The storage pools 152 include a plurality of storage devices 114 for storing data. The storage pools 152 present bounded storage volumes 154A-154N (may also be referred to as bounded storage volume 154 or bounded storage volumes 154) to workloads for storing and retrieving data. The bounded storage volumes 154 are assigned a maximum number of IOPS that it can process, also referred to as a QoS limit. This information is stored within volume configuration data, as described below. The storage pools 152 also present unbounded storage volumes 156A-156N (may also be referred to as unbounded storage volume 156 or unbounded storage volumes 154) that are not assigned a QoS limit. In one aspect, the IOPS limit for the unbounded storage volumes 156 is predicted or estimated, as described below in detail.

Figure 1C:
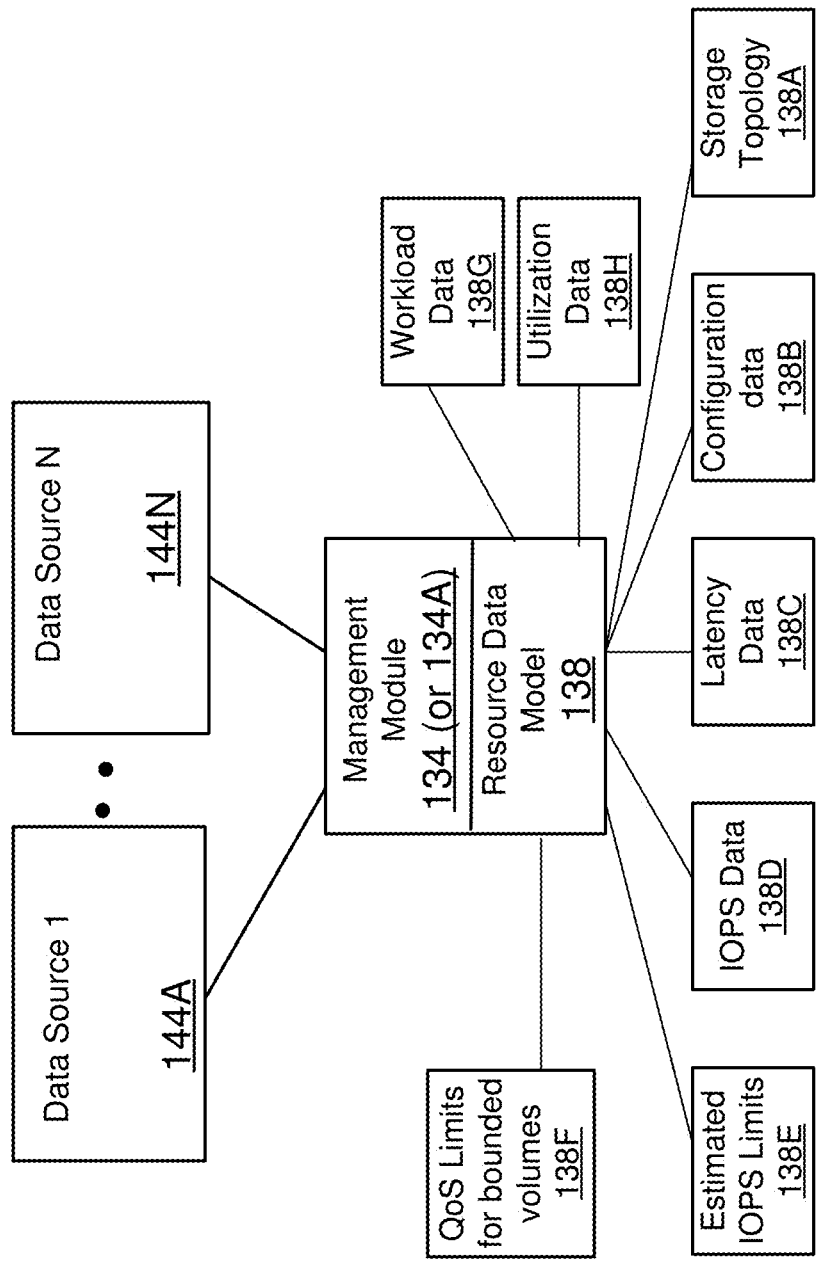
FIG. 1C shows an example of a resource data model generated and used, according to various aspects of the present disclosure.

FIG. 1C shows the details of the machine learned, resource data model 138, generated and used according to one aspect of the present disclosure. As an example, the management module 134A (or 134) collects information from various data sources 144A-144N (may also be referred to as data source 144 or data sources 144). As an example, the data sources 144 include the storage system 120 that provides information regarding the storage topology used to store workload data, performance data e.g., latency in processing I/O requests at a storage pool level and storage volume level, and the number of IOPS that are directed towards the storage pools and storage volumes at any given time and over time. The performance data is typically made available via the storage operating system 124. The data sources 144 also include application 126, cloud VM 110, user 108 and other workloads, which is used to identify bully and victim workloads.

The management module 134 stores the information received from data sources 144 in one or more data structures of the resource data model 138. For example, the resource data model 138 includes the storage topology 138A, configuration data 138B, latency data 138C, IOPS data 138D, estimated IOPS limits 138E, QoS limits for bounded volumes 138F, workload data 138G and utilization data 138H. It is noteworthy that the various data components are showed for clarity and may be combined into one or more data structures.

The storage topology 138A includes details of various resources that are associated with storage that is made available to workloads. The topology identifies the storage system 120, the logical and physical paths to storage and components that are used to process IOPS. The configuration data 138B identifies each shared resource, e.g., storage pool, storage volume, storage volume size, access control information, workloads that use the storage pools and storage volumes, threshold utilization value that indicates high utilization or any other shared resource configuration information. In one aspect, the configuration data 138B identifies each shared resource by a unique identifier, an instance of the cloud storage OS 140 that manages the shared resource, any policy associated with usage of the shared resource (e.g., a high utilization threshold value), a relationship that links the shared resource to another resource or any other resource configuration information.

The latency data 138C is time series latency information associated with each storage volume and/or storage pool indicating the latency associated with processing IOPS over time. The latency data can be obtained on an hourly basis or any other time interval. The IOPS data 138D provides the total number of IOPS directed towards a storage pool and/or storage volume. The estimated IOPS limit 138E is determined for unbounded storage volumes, as described below in detail. The QoS limits for bounded volumes 138E indicate the IOPS limit for bounded storage volumes. Information regarding each workload 150 is stored in workload data 138G, which includes workload identity, workload permissions, storage volumes assigned to the workloads or any other workload information. The utilization data 138H tracks the utilization of each shared resource including storage pools and/or storage volumes over time. The utilization data is used to identify/predict high utilization of shared resources, as described below in detail.

FIGS. 2A-2E, 2H and 2I show various process flow/block diagrams for implementing the various innovative technical features of the present disclosure. Although the various process blocks may appear to be in a chronological order, they can be implemented in any order. The process blocks are executed by one or more processors within the cloud layer 136 (FIG. 1) executing instructions out of a non-transitory memory.

Figure 2A:
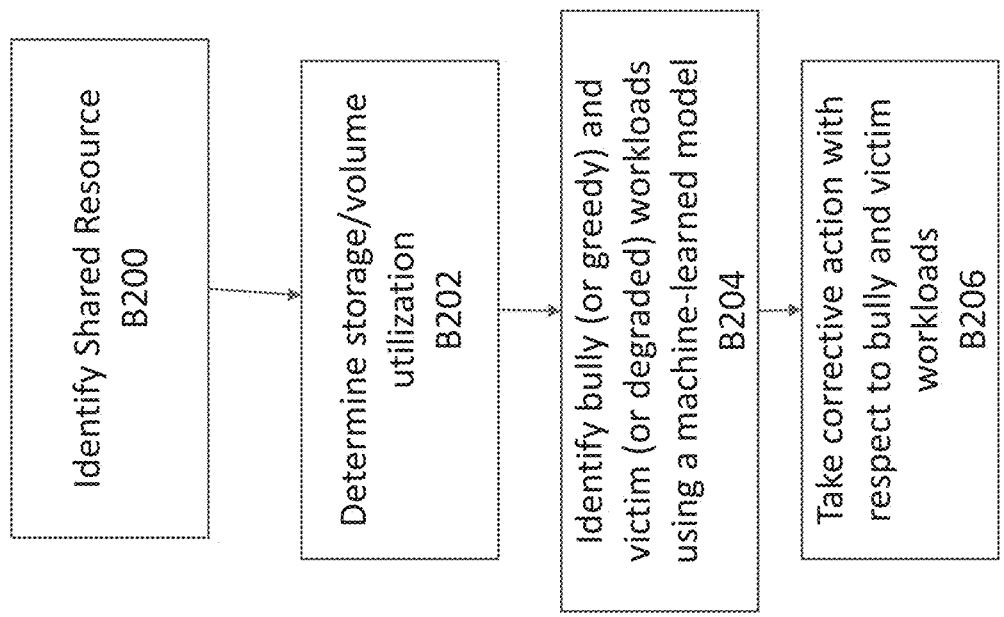
FIG. 2A shows a process for identifying bully (or greedy/impactful) workloads and victim (or degraded/impacted) workloads, according to various aspects of the present disclosure.

FIG. 2A shows a high-level process flow for identifying bully and victim workloads and taking appropriate corrective action to reduce the impact of bully workloads, according to one aspect of the present disclosure. In block B200, the management module 134A identifies shared resources, e.g., storage pools 152 and/or storage volumes 154. This information is stored in the resource data model 138 as described above in detail.

In block B202, the management module 134A monitors the resource usage of each shared resource to determine/predict resource utilization. This includes tracking the storage pool/storage volume utilization, the number of IOPS that are being processed by each storage volume or storage pool at any given time, throughput and latency for processing I/O requests by each shared resource, and then predicting resource contention or high utilization. This information may be stored as latency data 138C, IOPS data 138D and utilization data 138G as part of the resource data model 138, as described above.

In block B204, the ML model generator 106 identifies the bully and victim workloads due to actual or predicted storage resource contention, as described below in detail. A bully workload is an entity that may have issued a certain number of IOPS for a storage pool and/or storage volume that negatively impacts another workload, i.e. the victim workload. In block B206, the corrective action module 130 initiates an automatic corrective action to alleviate a bully/victim workload situation. This may involve moving workloads from one resource to another, throttling I/O request processing for the bully workload or any other type of corrective action. The nature of the corrective action will depend on the impact of a bully workload on the resource and the victims.

Figure 2B:
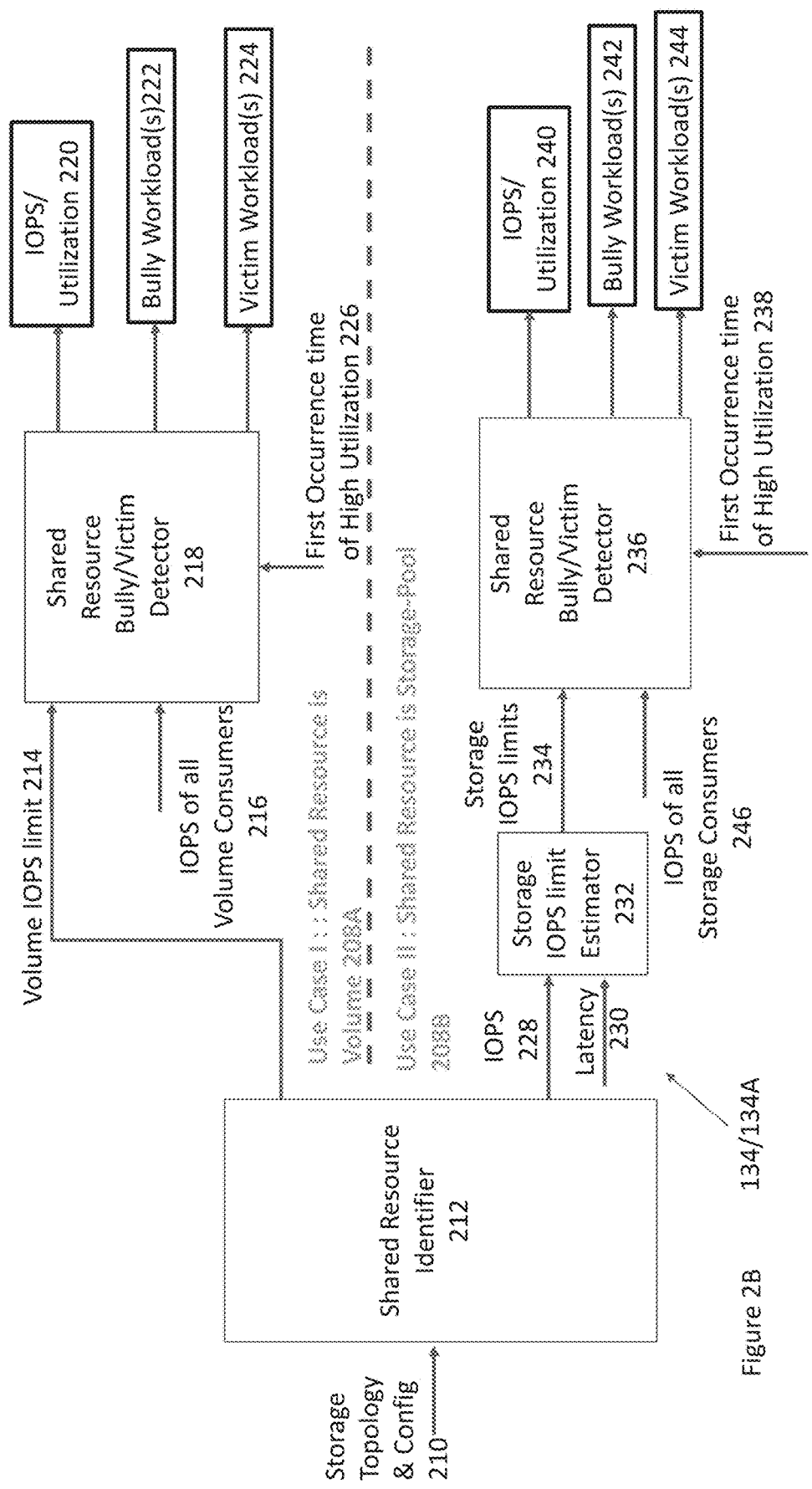
FIG. 2B shows a block diagram of an overall system for identifying bully and victim workloads, according to various aspects of the present disclosure.

FIG. 2B illustrates an example of the management module 134A/134, according to one aspect of the present disclosure. FIG. 2B shows two use cases, 208A and 208B that are handled by the management module. The use case 208A is for shared, bounded storage volumes 154, while the use case 208B is for shared storage pools 152 that may present both bounded and unbounded volumes 154 and 156, respectively. In one aspect, the management system 134A includes a shared resource identifier 212 that receives storage topology and configuration data 210 (i.e. 138A/138B, FIG. 1C) from different applications, host systems, storage systems, VMs or other entities of system 100, described above in detail. The storage topology and configuration data 210 identifies each shared resource, the relationships between shared resources, the entities that are sharing the shared resource and the entities that are managing the resource. This information is stored within resource data model 138, as described above.

When the shared resource are storage volumes, a shared resource bully/victim detector 218 (may also be referred to as detector 218) receives an IOPS limit 214 for the shared volumes and the total IOPS 216 directed towards each storage volume from different volume consumers/workloads. The term volume consumers in this context means any application, computing device, VM or any other entity that uses the shared volume to store and retrieve data. Detector 218 determines/predicts the storage volume (s) with high utilization (220) and identifies the bully workloads 222 and victim workloads 224 as described below in detail. In one aspect, detector 218 includes the ML generator 106 to identify bullies 222 and victims 224. The first occurrence time of high utilization (shown as 226) can be used to identify bully workloads 222 and victim workloads 224, as described below. Detector 218 also generates IOPS/utilization 220 that are used by the ML model generator 106 to build a machine learned model over time to predict resource contention for detecting bully and victim workloads.

For use case 208B, where the shared resources are storage pools 152 comprising of one of more storage devices/aggregates, the shared resource identifier 212 provides an IOPS time series 228 (e.g., from 138D, FIG. 1C) and a latency time series 230 (e.g., from 138C, FIG. 1C) to an estimator 232 (shown as storage IOPS limit estimator 232). Based on the received information (i.e., 228 and 230), the estimator 232 generates storage IOPS limits 234 that are provided to a detector 236 (similar to detector 218) and stored in the resource data model 138. Detector 236 also receives information regarding the total IOPS 246 for each storage pool and identifies (or predicts) one or more storage pools with high utilization based on a threshold utilization value. Detector 236 then identifies the bully workloads 242 and victim workloads 244 associated with the storage pool (s) with high utilization, as described below in detail. In one aspect, detector 236 also includes the ML generator 106 to identify bully workloads 242 and victim workloads 244, as described below. The first occurrence time of high utilization (shown as 238) can be used to identify bully workloads 242 and victim workloads 244. Detector 236 also generates IOPS/utilization 240 that are used by the ML model generator 106 to build a machine learned model overtime to predict resource contention (i.e., high utilization) detect bully and victim workloads.

Figure 2C:
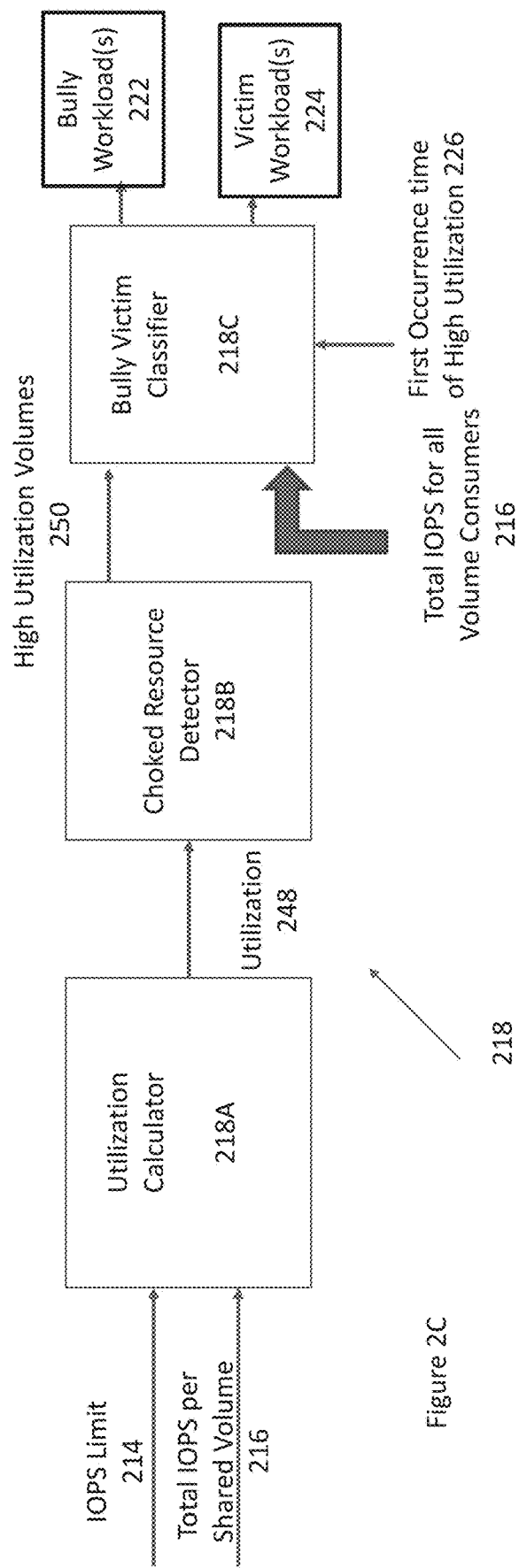
FIG. 2C shows an example of a bully/victim detector for a bounded storage volume, according to various aspects of the present disclosure.

FIG. 2C shows an example of the detector 218 for identifying bully workloads and victim workloads associated with one or more shared storage volumes of use case 208A, according to one aspect of the present disclosure. Detector 218 includes a utilization calculator 218A, a choked resource detector 218B and a bully victim classifier ("also referred to as "classifier") 218C that identifies bully workloads 222 and victim workloads 224 that are negatively impacted by the bully workloads 222. In one aspect, the classifier 218C includes or interfaces with the ML generator 106 to identify bully workloads 222 and victim workloads 224.

In one aspect, the utilization calculator 218A receives an IOPS limit 214 (e.g., based on the QoS limit 138E, FIG. 1C) for each shared storage volume and the total IOPS 216 directed towards each shared storage volume. The IOPS limit 214 indicates the number IOPS that the shared volumes are authorized to process. The total IOPS 216 indicates the total number of IOPS that are being processed by the shared volumes at any given time. This value may be for a certain duration. The utilization calculator 218A generates a utilization value 248 for each volume and provides it to the choked resource detector 218B. The utilization value 248 can provide a percentage value indicating the utilization of the storage volume at any given time. The utilization value 248 may also be a prediction of high utilization that is likely to occur based on total IOPS 216 over time.

The choked resource detector 218B identifies/predicts the resources with high utilization 250 and provides that information to the classifier 218C. In one aspect, a threshold value is used to identify the storage volumes with high utilization 250, e.g., if the utilization of any shared volume is equal to greater than X % (e.g., 80%), then the shared volume is identified as the high utilization volume or a storage volume that is in contention (or likely to be in contention, when the high utilization is predicted). The threshold value is stored in the resources data model 138 described above.

The classifier 218C receives the total IOPS 216 for one or more shared volumes that are identified with high utilization as well as the time 226 when the first occurrence of high utilization occurred. The classifier 218C then identifies the bully workloads 222 and victim workloads 224, as described below.

In one aspect, when the shared resource is a bounded, QoS volume, i.e., a storage volume with a configured QoS limit, the volume IOPS limit 214 is known from the QoS setting 138F. In this example, the headroom=1−utilization, where utilization is defined by:

$$\rho = \frac{IOPS}{IOPSmax}$$

For any volume with ρ≥X (e.g., 80%), the first moment of high utilization 226 is determined. At time 226, the classifier 218C, multiplies all IOPS for the identified shared volume with a rising step function, and sums each vector multiplication to determine a numerical value. A bully workload is identified with the highest positive sum and a victim workload is identified by the most negative value, as shown in FIG. 2G.

Figure 2D:
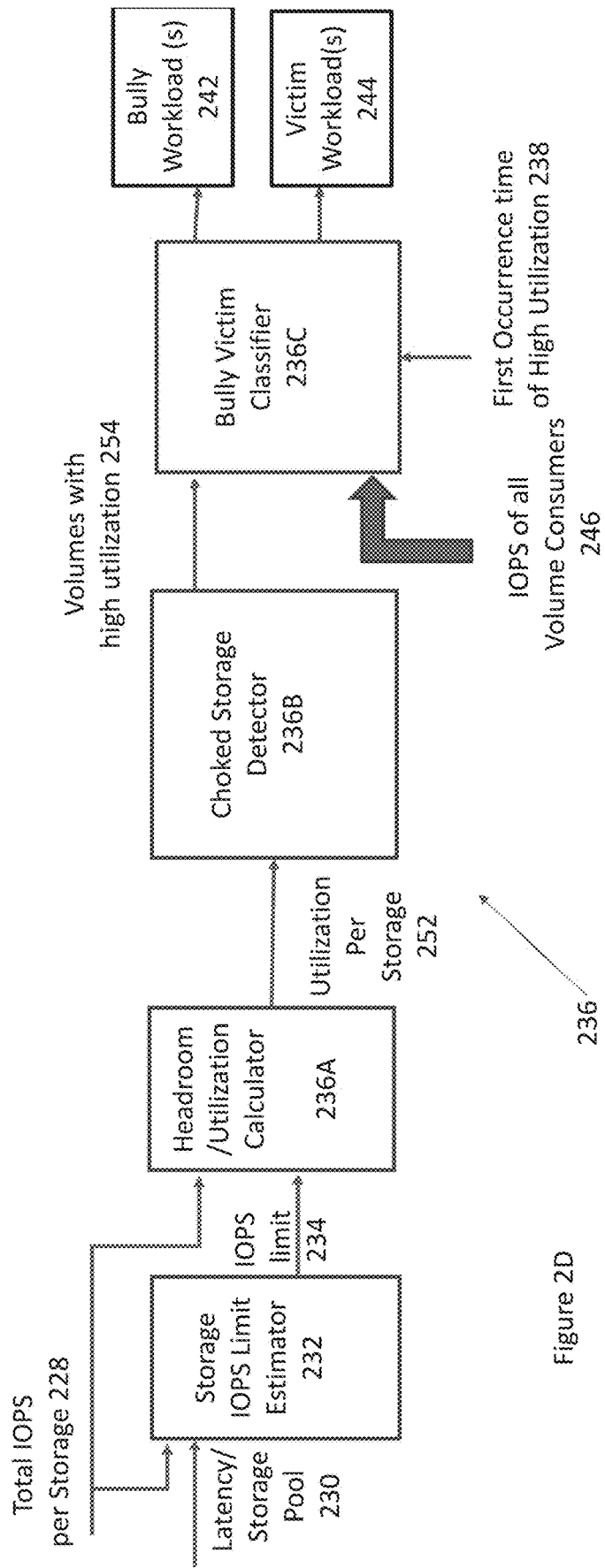
FIG. 2D shows another example of a bully/victim detector for a storage pool that is used by both bounded and unbounded storage volumes, according to various aspects of the present disclosure.

FIG. 2D shows an example of detector 236 for use case 208B, according to one aspect of the present disclosure. Detector 236 includes a headroom/utilization calculator 236A, a choked resource detector 236B and a bully victim classifier (also referred to as "classifier") 236C that identifies bully workloads 242 and victim workloads 244 impacted by the bully workloads. In one aspect, the classifier 236C includes or interfaces with the ML generator 106 to identify bully workloads 242 and victim workloads 244.

In one aspect, headroom/utilization calculator 236A receives the total IOPS 228 directed towards each shared storage pool and the IOPS limit 234 for the shared storage pool as determined by estimator 232. The estimator 232 receives latency data 230 associated with each shared storage pool. The latency data 230 is formatted as a "time-series" indicating delays in processing I/O requests by each shared storage pool over time. The total IOPS 228 indicate the number of IOPS directed towards each storage pool over time. The latency data 230 is based on the latency of volumes presented by the storage pool without any QoS limit. The total IOPS 228 are based on volumes that are configured with QoS values and without QoS values. The estimator 232 determines the IOPS limit 234, as described below and provides the IOPS limit 234 to the headroom/utilization calculator 236A. The headroom/utilization calculator 236A then generates/predicts a utilization value 252 for each storage entity of the storage pool and provides it to the choked resource detector 236B. The choked resource detector 236B identifies/predicts the storage volumes presented from the shared storage pool with high utilization 254 and provides the same to the classifier 236C. The classifier 236C receives the total IOPS 246 for all volume consumers as well as the time 238 when the first occurrence of high utilization occurred. The classifier 236C then identifies the bully workloads 242 and victim workloads 244, as described below.

In one aspect, the headroom/utilization calculator 236B determines a contention ratio for each storage pool based on utilization defined as:

$$\rho = \frac{IOPS}{IOPSmax}$$

For each storage pool with ρ≥X % (e.g., 80), identifies the first moment of high utilization, and the first occurrence time of high utilization 238 is determined. Choked storage detector 236B multiplies all IOPS 246 issued by each workload with a rising step function and sums each vector multiplication to a single number. The bully workloads are those with the highest positive number and victim workloads are those with the most negative result.

In one aspect, some of the storage pool volumes may not be assigned any QoS value. In that instance, the estimator 232 understands the entire storage pool by generating a scatter plot of latency vs IOPS of all storage volumes of the storage pool including QOS volumes presented by the storage pool. The scatter plot is best fit using a parabolic curve where Log (Latency)=a1·IOPS²+b0, where a and b are regression coefficients.

$$Storage_{IOPSmax}(\text{i.e. } IOPS \text{ limit } 234) \sqrt{\frac{\log(q_{max})}{a}} q_{max}$$

Maximum allowed Latency is defined by =exp(b)*$q_{max}$, where q=Queue depth. A "Queue" in this context means the average wait time for processing an I/O request. The estimator 232 uses the parabolic curve to find/predict the IOPS where service drops by $q_{max}$. The storage IOPS limit 234 is determined by:

$$Storage_{IOPSmax}(\text{i.e. } IOPS \text{ limit } 234) \sqrt{\frac{\log(q_{max})}{a}} q_{max} =,$$

$$Storage_{IOPSmax}(\text{i.e. } IOPS \text{ limit } 234) \sqrt{\frac{\log(q_{max})}{a}} q_{max}$$

where is the max average latency multiple over a baseline latency value.

Figure 2E:
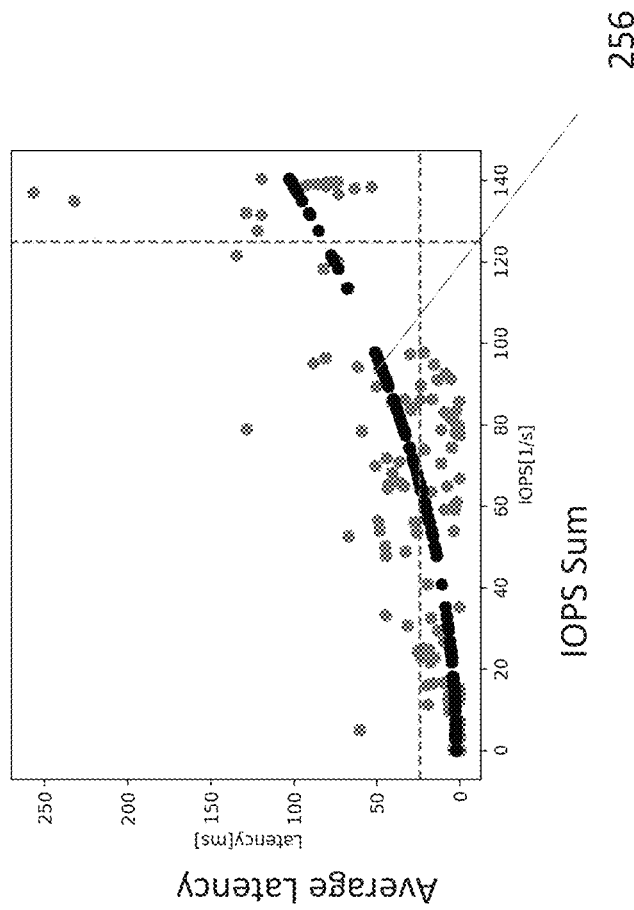
FIG. 2E shows an example of a parabolic curve to determine a storage pool's IOPS (Input/Output per Second) limit, according to various aspects of the present disclosure.
Figure 2G:
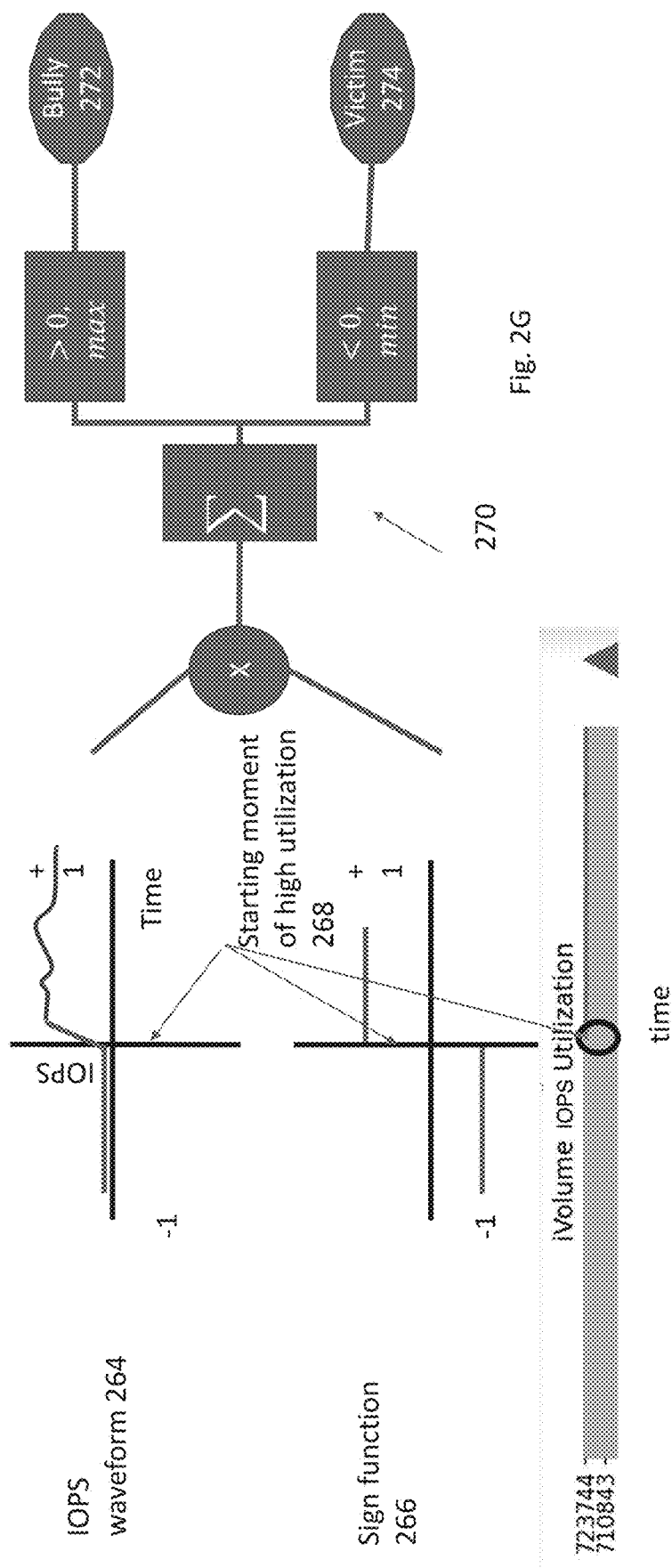
FIG. 2G shows an example of a bully classifier that identifies bully workloads, according to various aspects of the present disclosure.

FIG. 2E shows an example of a parabolic curve 256 used for determining the storage IOPS limit 234 by the estimator 232. Curve 256 is generated based on the relationship between average latency and the sum of IOPS overtime. As mentioned above, curve 256 is generated based on the following:

Log(Latency)=$a1 \cdot IOPS^2 + b0$

[a10 b]=Weighted Least Squares of Latency
 [a10
with respect to IOPS $$\begin{bmatrix} a1 \\ b0 \end{bmatrix} = Apinv \cdot \begin{bmatrix} y0 \\ \vdots \\ yN \end{bmatrix}$$

Where:
 y0 . . . yN=Latency0, . . . LatencyN
 x0 . . . xN=IOPS0, . . . IOPSN
The empirically measured IOPS and Latency are given as
 x0 . . . xN and y0 . . . yN.

$$Apinv = \left( \begin{bmatrix} x0^{\wedge}2, x1^{\wedge}2 \ldots xN^{\wedge}2 \end{bmatrix}^T \cdot W \cdot \begin{bmatrix} x0^2, x1^2 \ldots xN^2 \\ 1 \quad 1 \ldots .1 \end{bmatrix} \right)^{-1}$$
$$\cdot \begin{bmatrix} x0^{\wedge}2, x1^{\wedge}2 \ldots xN^{\wedge}2 \\ 1 \quad 1 \ldots .1 \end{bmatrix}^T \cdot W$$

W=N×N diagonal weight matrix=diag([x0, x1, . . . XN])
N is the number of sample points FIG. 2F shows an example of a latency vs Maximum IOPS curve 258. Point 262 on curve 258 indicates the used capacity and point 260 on curve 258 is an optimum point, after which the latency increases exponentially. The region between point 260 and 262 indicates the available capacity (or headroom) for the resource, at any given time.

FIG. 2G illustrates detecting bully and victim workloads using the innovative technology disclosed herein, according to one aspect of the present disclosure. An IOPS waveform 264 with IOPS on the Y-axis and time on the X-axis shows the distribution of IOPS overtime for a workload. The starting moment 268 indicates when high utilization started of a shared resource. The stepping (or sine) function 266 is used by the logic 270 to determine the bully workload 272 and victim workloads 274, similar to 222/242 and 224/244, described above.

Figure 2H:
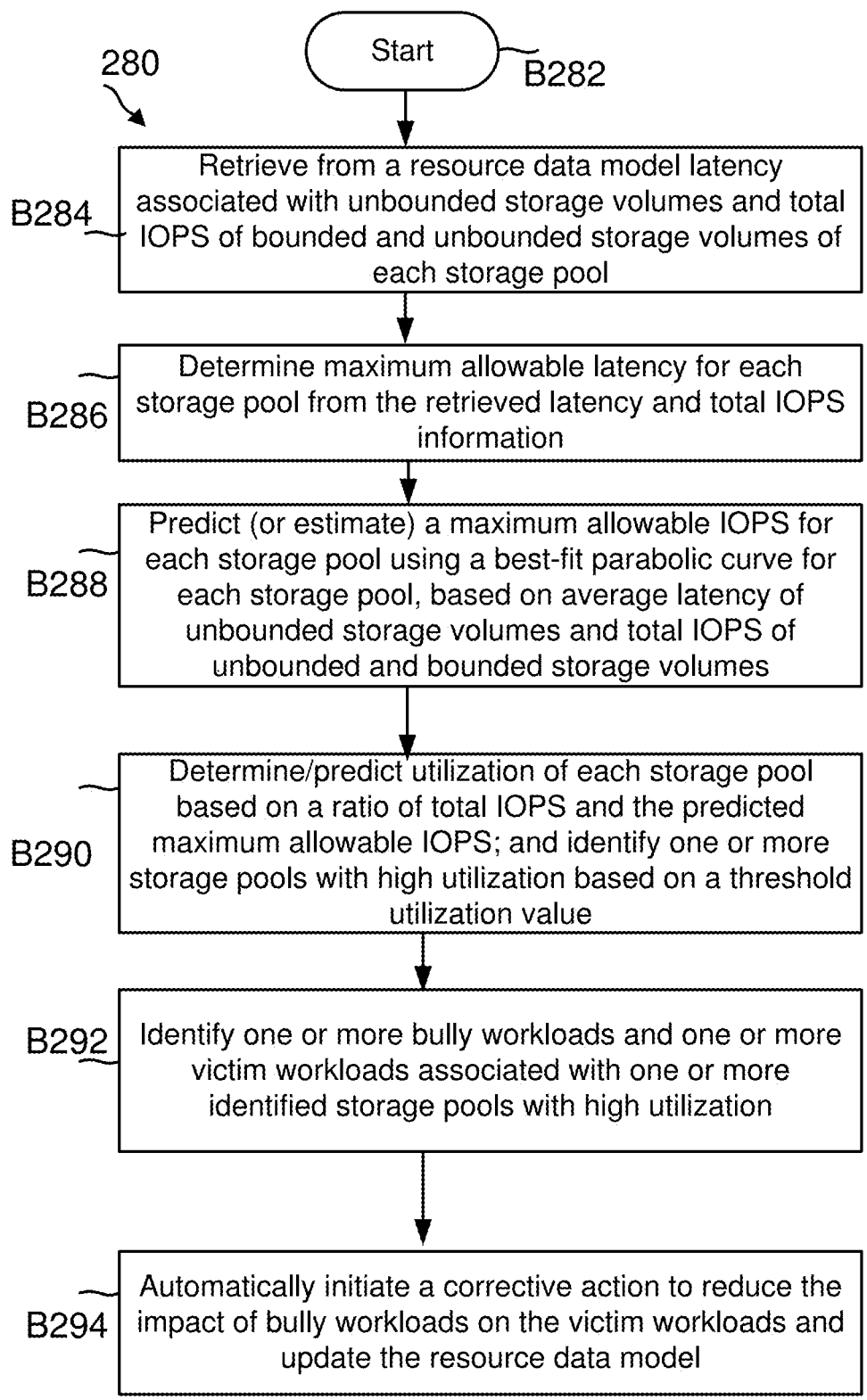
FIG. 2H shows a process for identifying bully and victim workloads of a storage pool, according to various aspects of the present disclosure.

FIG. 2H shows a process 280 for detecting bully and victim workloads using a storage pool that may present both bounded and unbounded storage volumes, according to one aspect of the present disclosure. Process 280 begins in block B282, after the resource data model 138 has been populated including latency information, IOPS related information and information regarding workloads that issue IOPS for storage pools that may present both unbound and bounded QoS volumes.

In block B284, the latency data 230 and the total IOPS per storage pool 228 are retrieved by the estimator 232 (FIG. 2D) from the resource data model 138. In block B286, the maximum allowable latency for each storage pool is determined/predicted from the retrieved latency and total IOPS information. In block B288, the estimator 232 generates a best-fit parabolic curve 256 for each storage pool, based on average latency of unbounded storage volumes and total IOPS of both unbounded and bounded storage volumes. The IOPS limit 234 is provided to detector 236B.

In block B290, the utilization of each storage pool is determined/predicted based on a ratio of total IOPS for each storage pool and the IOPS estimate 234 determined in block B288. The utilization value is compared with a configurable threshold value to identify one or more storage pools with a high utilization or likely to be highly utilized, as described above in detail. The information regarding storage pools with the high utilization 254 is provided to classifier 236C.

In block B292, the classifier 236C determines the first-time (e.g., 238) high utilization occurred and identifies a change in behavior of different workloads at that time. This includes determining which workloads may have issued more IOPS directed towards the volumes associated with the storage pools identified as highly utilized. The workload behavior is determined from workload data 138J and storage topology 138A. The classifier 236C multiplies all IOPS issued by each workload using the identified storage pool with a rising step function and sums each vector multiplication to a single number, as shown in FIG. 2E. The bully workloads are those with the highest positive number and victim workloads are those with the most negative result.

In block B294, a corrective action is executed to reduce the impact of the bully workloads, e.g., the bully workloads are moved to different storage pools, additional storage capacity is deployed and/or a QoS policy is added to the unbounded volumes to avoid the bully/victim situation. Thereafter, the resource data model 138 is updated and process 280 continues for a next time cycle.

Figure 2I:
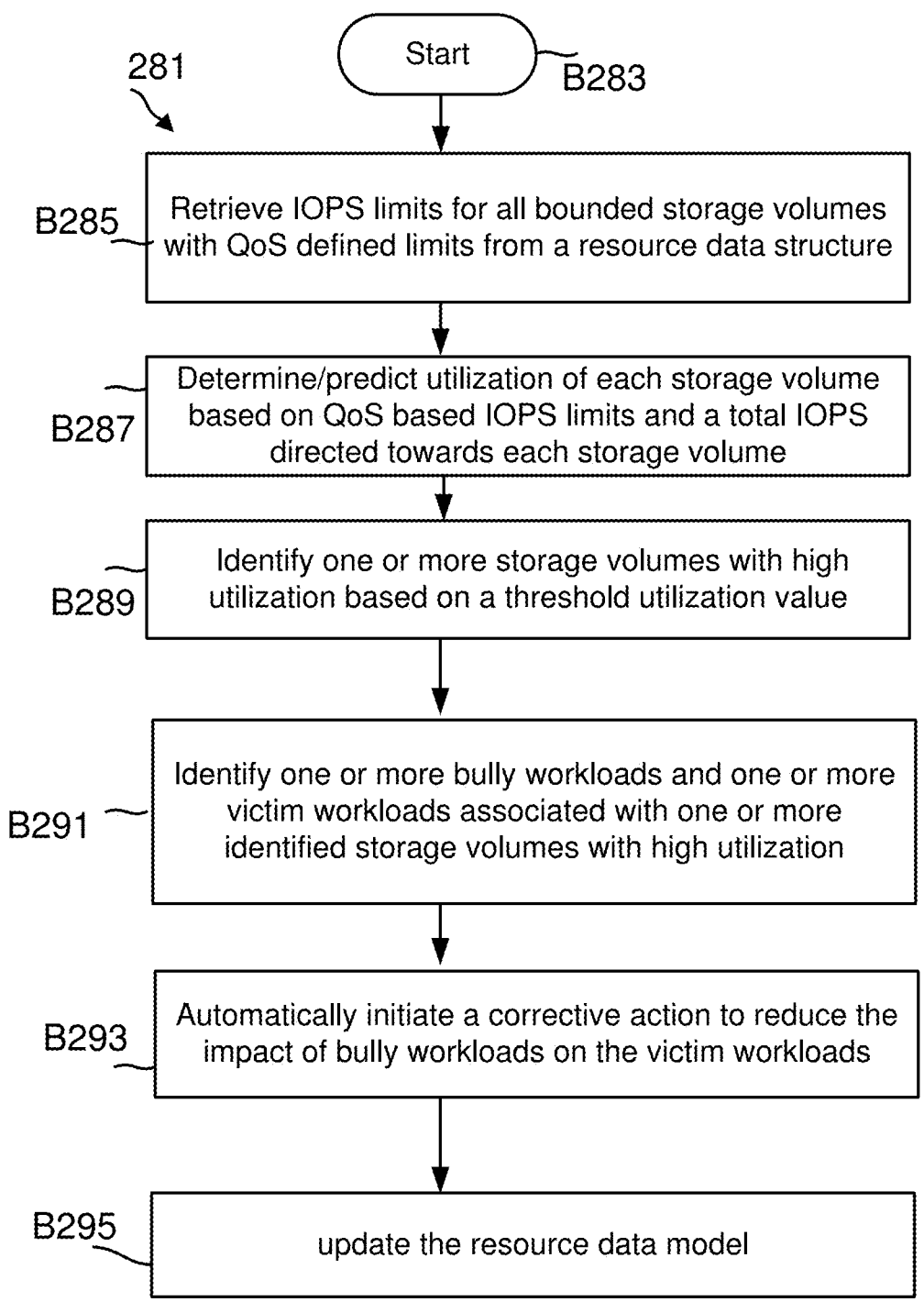
FIG. 2I shows a process for identifying bully and victim workloads of a bounded storage volume (e.g., a storage volume with quality-of-service limits), according to various aspects of the present disclosure.
Figure 2J:
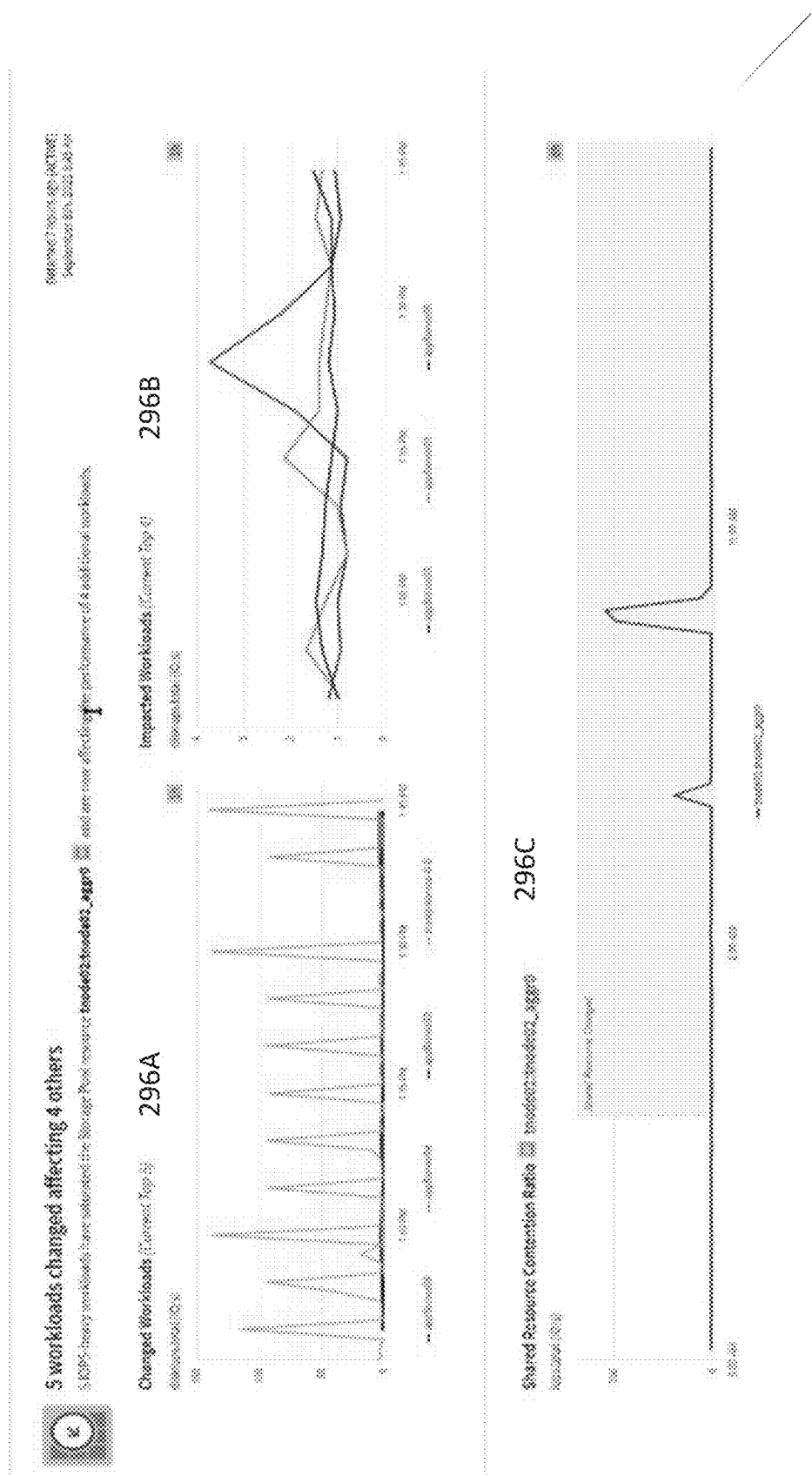
FIG. 2J shows an example of identifying bully and victim workloads, according to various aspects of the present disclosure.

An example of executing process 280 is shown in FIG. 2J in the screenshot 296. Segment 296A shows the bully workloads, segment 296B shows victims and segment 296C shows the storage pool in contention i.e. high utilization.

FIG. 2I shows a process 281 for detecting bully and victim workloads for bounded volumes with QoS, according to one aspect of the present disclosure. Process 281 begins in block B283, after the resource data model 138 has been populated with latency information, IOPS related information and information regarding workloads that issue IOPS directed towards a storage pool that may present both unbound and bounded QoS volumes.

In block B285, the IOPS limit 214 based on a QoS limit and the total IOPS 216 for each bounded volume is retrieved from the resource data model 138. In block B287, the utilization of each storage volume is determined/predicted based on a ratio of the total IOPS 216 for each storage volume over time and the IOPS limit 214.

In block B289, the utilization value of each storage volume is compared with a configurable threshold value to identify one or more storage volumes with a high utilization by detector 218B, as described above in detail. The information regarding storage volumes with high utilization 250 is provided to the classifier 218C.

In block B291, the classifier 236C determines the first-time high utilization occurred (226) and identifies a change in behavior of workloads at that time. This includes determining which workloads may have issued more IOPS directed towards the volumes identified as highly utilized. The classifier 236C multiplies all IOPS issued by each workload using the identified storage volume with a rising step function and sums each vector multiplication to a single number. The bully workloads are those with the highest positive number and victim workloads are those with the most negative result.

In block B293, a corrective action is executed to reduce the impact of the bully workloads, e.g., the bully workloads are moved to different storage pools, additional storage capacity is deployed and/or a QoS policy is added to the unbounded volumes to avoid the bully/victim situation. Thereafter, in block B295, the resource data model 138 is updated and the process 280 continues for a next time cycle.

An example of executing process 281 is shown in FIG. 2J in the screenshot 296. Segment 296A shows the bully workloads, segment 296B shows victims and segment 296C shows the storage pool in contention i.e., high utilization.

In one aspect, methods and systems for a networked storage system are provided. One method includes generating, by a processor, a resource data structure (e.g. 138, FIG. 1C) for storing a storage topology (e.g., 138A, FIG. 1C) of a network storage system, the storage topology identifying each shared resource of the networked storage system including a plurality of shared storage pools (e.g., 152, FIG. 1B), each storage pool having storage capacity to store data using storage volumes with and without quality of service (QoS) limits (e.g., 138E, FIG. 1E); retrieving (e.g., B284, FIG. 2H), by the processor, from the resource data structure, latency (e.g., 230, FIG. 2D) associated with each storage pool, and a total number of IOPS (e.g., 228, FIG. 2D) directed towards all the storage volumes associated with each storage pool, wherein the latency indicates a delay in processing input/output (I/O) requests and is based on a delay associated with storage volumes of each storage pool without assigned QoS limits; predicting (e.g., B288, FIG. 2H) by the processor, an IOPS limit (e.g., 234, FIG. 2D) for each storage pool based on a maximum allowed latency of each storage pool, the maximum allowed latency determined from a relationship between the retrieved latency and the total number of IOPS from the resource data structure;

identifying (e.g., B290, FIG. 2H), by the processor, a storage pool whose utilization has reached a threshold value, the utilization based on a total number of IOPS directed towards the storage pool and a predicted IOPS limit; detecting (e.g., B292, FIG. 2H), by the processor, a bully workload (e.g., 242, FIG. 2D) based on a numerical value determined from a total number of IOPS issued by the bully workload for the storage pool and a rising step function (e.g., 266, FIG. 2G); and implementing (e.g., B294, FIG. 2H), by the processor, a corrective action to reduce an impact of the bully workload on a victim workload.

The method further includes identifying (e.g., B294, FIG. 2H), by the processor, the victim workload based on a numerical value determined from a total number of IOPS issued by the victim workload for the storage pool and the rising step function (e.g., 266, FIG. 2G).

The method also includes generating (B288, FIG. 2H), by the processor, a best fit parabolic curve (e.g., 256, FIG. 2E) for each storage pool to predict the IOPS limit of each storage pool, the best fit parabolic curve based on average latency of storage volumes of each storage pool without QoS limits and a total number of IOPS for all storage volumes of each storage pool, with and without QoS limits.

The method further includes identifying (e.g., use case 208A, FIG. 2A), by the processor, a plurality of storage volumes as shared resources from the resource data structure, each storage volume assigned a QoS limit indicating an allowed number of IOPS for each storage volume.

The method also includes detecting (e.g., 289, FIG. 2I), by the processor, a storage volume whose utilization has reached a threshold value, the utilization based on a total number of IOPS directed towards the storage volume and a QoS IOPS limit for the storage volume.

The method also includes detecting (e.g., B291, FIG. 2I), by the processor, a bully workload based on a numerical value determined from a total number of IOPS issued by the bully workload for the storage volume and a rising step function; and implementing (e.g., B293, FIG. 2I), by the processor, a corrective action to reduce an impact of the bully workload on a victim workload.

Figure 3:
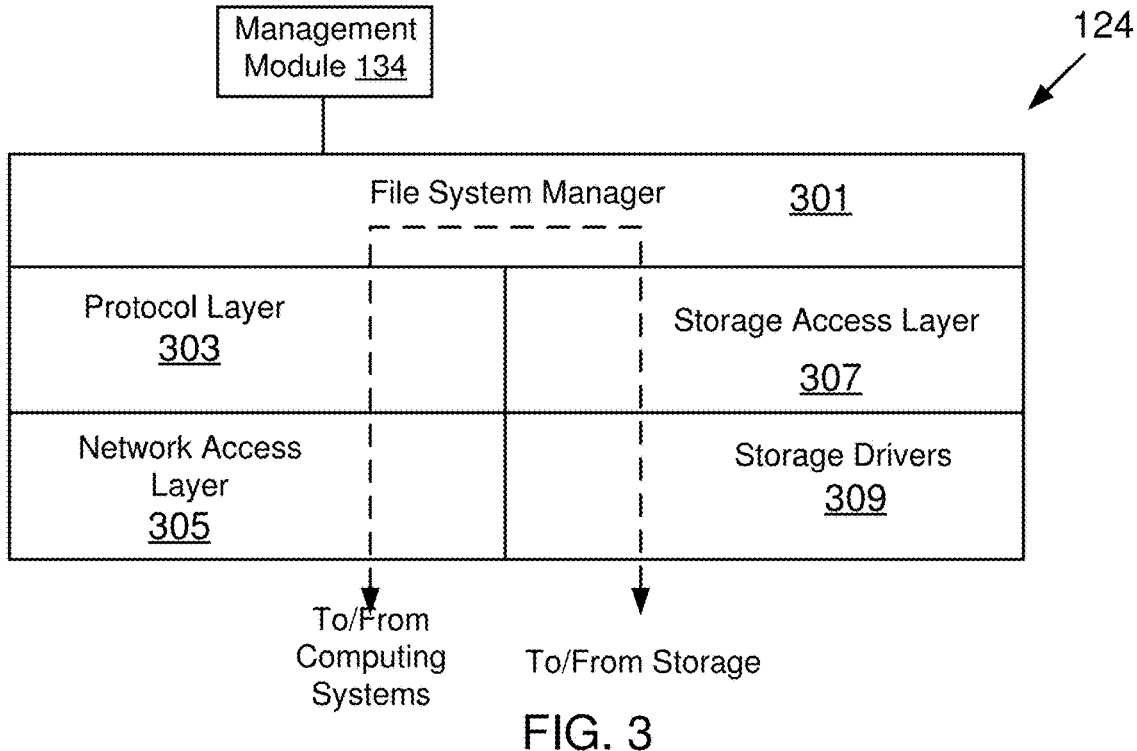
FIG. 3 shows an example of a storage operating system, used according to various aspects of the present disclosure.

Storage Operating System: FIG. 3 illustrates a generic example of storage operating system 124 executed by storage system 120 (or the cloud storage OS 140 in the cloud layer 136) and interfacing with the management module 134/134A, according to one aspect of the present disclosure. In another aspect, the management module 134/134A is integrated with the storage operating system 124/cloud storage OS 140.

As an example, operating system 230 may include several modules, or "layers". These layers include a file system manager 301 that keeps track of a directory structure (hierarchy) of the data stored in storage devices and manages read/write operations, i.e., executes read/write operations on storage devices in response to server system 102 requests.

Operating system 124 may also include a protocol layer 303 and an associated network access layer 305 to communicate over a network with other systems, such as host system 102A-102N and the cloud layer 136. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 102A-102N and mass storage devices 114 are illustrated schematically as a path, which illustrates the flow of data through operating system 124.

The operating system 124 may also include a storage access layer 307 and an associated storage driver layer 309 to communicate with a storage device. The storage access layer 307 may implement a higher-level storage protocol, such as RAID (redundant array of inexpensive disks), while the storage driver layer 309 may implement a lower-level storage device access protocol, such as FC, SCSI or any other protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure may be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
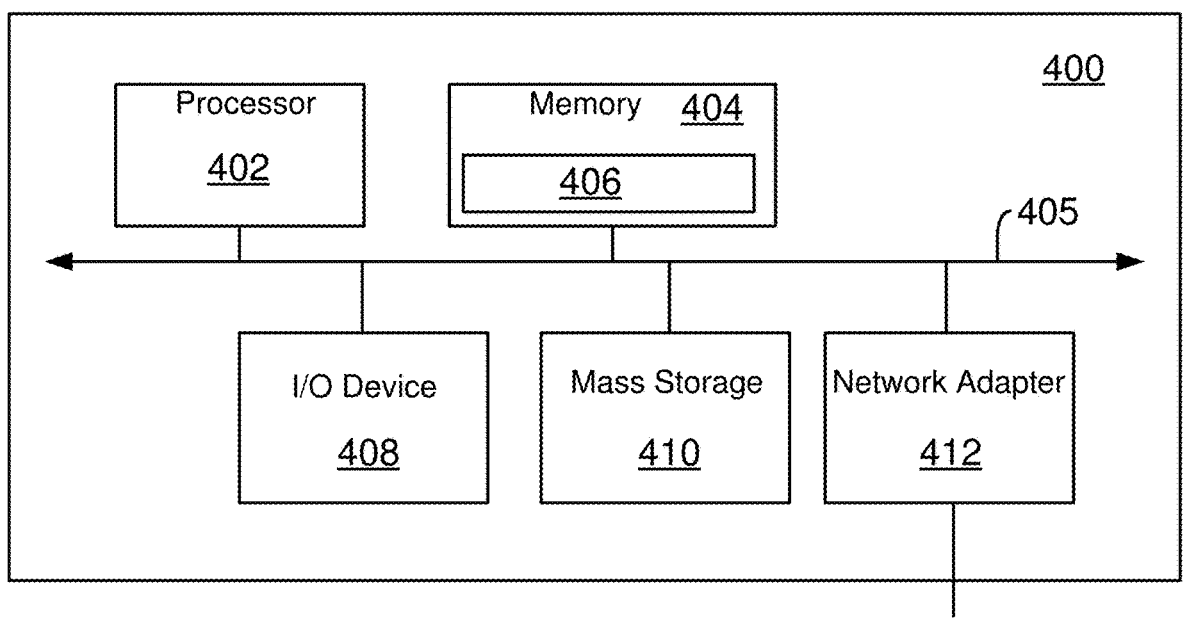
FIG. 4 shows an example of a processing system, according to various aspects of the present disclosure.

Processing System: FIG. 4 is a high-level block diagram showing an example of the architecture of a processing system, at a high level, in which executable instructions as described above may be implemented. The processing system 400 can represent modules of the storage system 120, host systems 102A-102N, components of the cloud layer 136, user 108, a computing system executing the cloud manager 122, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 2A-2D, 2H and 2I and storing the resource data model 138.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, a method and apparatus for managing resources for cloud-based storage have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
generating, by a processor, a resource data structure for storing a storage topology of a network storage system, the storage topology identifying each shared resource of the networked storage system including a plurality of shared storage pools, each storage pool having storage capacity to store data using storage volumes with and without quality of service (QoS) limits;
retrieving, by the processor, from the resource data structure, latency associated with each storage pool, and a total number of I/O requests (IOPS) directed towards all the storage volumes associated with each storage pool, wherein the latency indicates a delay in processing input/output (I/O) requests and is based on a delay associated with storage volumes of each storage pool without assigned QoS limits;
predicting, by the processor, an IOPS limit for each storage pool based on a maximum allowed latency of each storage pool, the maximum allowed latency determined from a relationship between the retrieved latency and the total number of IOPS from the resource data structure;
identifying, by the processor, a storage pool whose utilization has reached a threshold value, the utilization based on a total number of IOPS directed towards the storage pool and a predicted IOPS limit;
detecting, by the processor, a bully workload based on a numerical value determined from a total number of IOPS issued by the bully workload for the storage pool and a rising step function; and
implementing, by the processor, a corrective action to reduce an impact of the bully workload on a victim workload.

2. The method of claim 1, further comprising:
identifying, by the processor, the victim workload based on a numerical value determined from a total number of IOPS issued by the victim workload for the storage pool and the rising step function.

3. The method of claim 1, further comprising:
generating, by the processor, a best fit parabolic curve for each storage pool to predict the IOPS limit of each storage pool, the best fit parabolic curve based on average latency of storage volumes of each storage pool without QoS limits and a total number of IOPS for all storage volumes of each storage pool, with and without QoS limits.

4. The method of claim 1, further comprising:
identifying, by the processor, a plurality of storage volumes as shared resources from the resource data structure, each storage volume assigned a QoS limit indicating an allowed number of IOPS for each storage volume.

5. The method of claim 4, further comprising:
detecting, by the processor, a storage volume whose utilization has reached a threshold value, the utilization based on a total number of IOPS directed towards the storage volume and a QoS IOPS limit for the storage volume.

6. The method of claim 5, further comprising:
detecting, by the processor, a second bully workload based on a numerical value determined from a total number of IOPS issued by the second bully workload for the storage volume and a rising step function; and
implementing, by the processor, a corrective action to reduce an impact of the second bully workload on a second victim workload.

7. The method of claim 6, further comprising:
identifying, by the processor, the second victim workload based on a numerical value determined from a total number of IOPS issued by the second victim workload for the storage volume and the rising step function.

8. A non-transitory, machine readable storage medium having stored thereon instructions comprising machine executable code, which when executed by a machine, causes the machine to:
generate a resource data structure for storing a storage topology of a network storage system, the storage topology identifying each shared resource of the networked storage system including a plurality of shared storage pools, each storage pool having storage capacity to store data using storage volumes with and without quality of service (QoS) limits;

retrieve from the resource data structure, latency associated with each storage pool, and a total number of I/O requests (IOPS) directed towards all the storage volumes associated with each storage pool, wherein the latency indicates a delay in processing input/output (I/O) requests and is based on a delay associated with storage volumes of each storage pool without assigned QoS limits;

predict an IOPS limit for each storage pool based on a maximum allowed latency of each storage pool, the maximum allowed latency determined from a relationship between the retrieved latency and the total number of IOPS from the resource data structure;

identify a storage pool whose utilization has reached a threshold value, the utilization based on a total number of IOPS directed towards the storage pool and a predicted IOPS limit;

detect a bully workload based on a numerical value determined from a total number of IOPS issued by the bully workload for the storage pool and a rising step function; and implement a corrective action to reduce an impact of the bully workload on a victim workload.

9. The non-transitory, machine readable storage medium of claim 8, wherein the
machine executable code further causes the machine to:
identify the victim workload based on a numerical value determined from a total number of IOPS issued by the victim workload for the storage pool and the rising step function.

10. The non-transitory, machine readable storage medium of claim 8, wherein the
machine executable code further causes the machine to:
generate a best fit parabolic curve for each storage pool to predict the IOPS limit of each storage pool, the best fit parabolic curve based on average latency of storage volumes of each storage pool without QoS limits and a total number of IOPS for all storage volumes of each storage pool, with and without QoS limits.

11. The non-transitory, machine-readable storage medium of claim 8, wherein the
machine executable code further causes the machine to:
identify a plurality of storage volumes as shared resources from the resource data structure, each storage volume assigned a QoS limit indicating an allowed number of IOPS for each storage volume.

12. The non-transitory, machine readable storage medium of claim 11, wherein
the machine executable code further causes the machine to:
detect a storage volume whose utilization has reached a threshold value, the utilization based on a total number of IOPS directed towards the storage volume and a QoS IOPS limit for the storage volume.

13. The non-transitory, machine readable storage medium of claim 12,
wherein the machine executable code further causes the machine to:
detect a second bully workload based on a numerical value determined from a total number of IOPS issued by second the bully workload for the storage volume and a rising step function; and
implement a corrective action to reduce an impact of the second bully workload on a second victim workload.

14. The non-transitory, machine readable storage medium of claim 13, wherein the machine executable code further causes the machine to:
identify the second victim workload based on a numerical value determined from a total number of IOPS issued by the second victim workload for the storage volume and the rising step function.

15. A system, comprising:
a memory containing machine readable medium comprising machine executable code
having stored thereon instructions; and
a processor coupled to the memory to execute the machine executable code to: generate a resource data structure for storing a storage topology of a network storage system, the storage topology identifying each shared resource of the networked storage system including a plurality of shared storage pools, each storage pool having storage capacity to store data using storage volumes with and without quality of service (QoS) limits;

retrieve from the resource data structure, latency associated with each storage pool, and a total number of I/O requests (IOPS) directed towards all the storage volumes associated with each storage pool, wherein the latency indicates a delay in processing input/output (I/O) requests and is based on a delay associated with storage volumes of each storage pool without assigned QoS limits;

predict an IOPS limit for each storage pool based on a maximum allowed latency of each storage pool, the maximum allowed latency determined from a relationship between the retrieved latency and the total number of IOPS from the resource data structure;

identify a storage pool whose utilization has reached a threshold value, the utilization based on a total number of IOPS directed towards the storage pool and a predicted IOPS limit;

detect a bully workload based on a numerical value determined from a total number of IOPS issued by the bully workload for the storage pool and a rising step function; and implement a corrective action to reduce an impact of the bully workload on a victim workload.

16. The system of claim 15, wherein the machine executable code further
causes the processor to:
identify the victim workload based on a numerical value determined from a total number of IOPS issued by the victim workload for the storage pool and the rising step function.

17. The system of claim 15, wherein the machine executable code further
causes the processor to:
generate a best fit parabolic curve for each storage pool to predict the IOPS limit of each storage pool, the best fit parabolic curve based on average latency of storage volumes of each storage pool without QoS limits and a total number of IOPS for all storage volumes of each storage pool, with and without QoS limits.

18. The system of claim 15, wherein the machine executable code further
causes the processor to:
identify a plurality of storage volumes as shared resources from the resource data structure, each storage volume assigned a QoS limit indicating an allowed number of IOPS for each storage volume.

19. The system of claim 18, wherein the machine executable code further causes the processor to:
detect a storage volume whose utilization has reached a threshold value, the utilization based on a total number of IOPS directed towards the storage volume and a QoS IOPS limit for the storage volume.

20. The system of claim 19, wherein the machine executable code further causes the processor to:
detect a second bully workload based on a numerical value determined from a total number of IOPS issued by the bully workload for the storage volume and a rising step function; and
implement a corrective action to reduce an impact of the second bully workload on a second victim workload.

* * * * *